United States Patent [19]

Circello

[11] Patent Number: 4,597,044

[45] Date of Patent: Jun. 24, 1986

[54] APPARATUS AND METHOD FOR PROVIDING A COMPOSITE DESCRIPTOR IN A DATA PROCESSING SYSTEM

[75] Inventor: Joseph C. Circello, Phoenix, Ariz.

[73] Assignee: Honeywell Information Systems, Inc., Phoenix, Ariz.

[21] Appl. No.: 434,345

[22] Filed: Oct. 14, 1982

[51] Int. Cl.[4] ............................................. G06F 12/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,135,242 | 1/1979 | Ward et al. | 364/200 |
| 4,400,769 | 8/1983 | Kaneda et al. | 364/200 |
| 4,459,661 | 7/1984 | Kaneda et al. | 364/200 |

*Primary Examiner*—Gareth D. Shaw
*Assistant Examiner*—John J. Salotto
*Attorney, Agent, or Firm*—A. A. Sapelli; J. S. Solakian; A. Medved

[57] ABSTRACT

In a data processing system including a central processing unit capable of operation with a plurality of operating systems, a VMSM unit is described for producing a composite decor descriptor from a plurality of possible decor descriptor formats. The VMSM unit includes an input buffer unit and an output buffer unit, a control unit to analyze an incoming DATA and provide appropriate control signals, a reconfiguration unit for reformatting the plurality of descriptor formats into a composite format, a descriptor fetch unit for retrieving a descriptor when the signals applied to the VMSM unit contain a descriptor address, and a descriptor master copy unit which contains a copy of the descriptors stored in the addressing apparatus.

11 Claims, 14 Drawing Figures

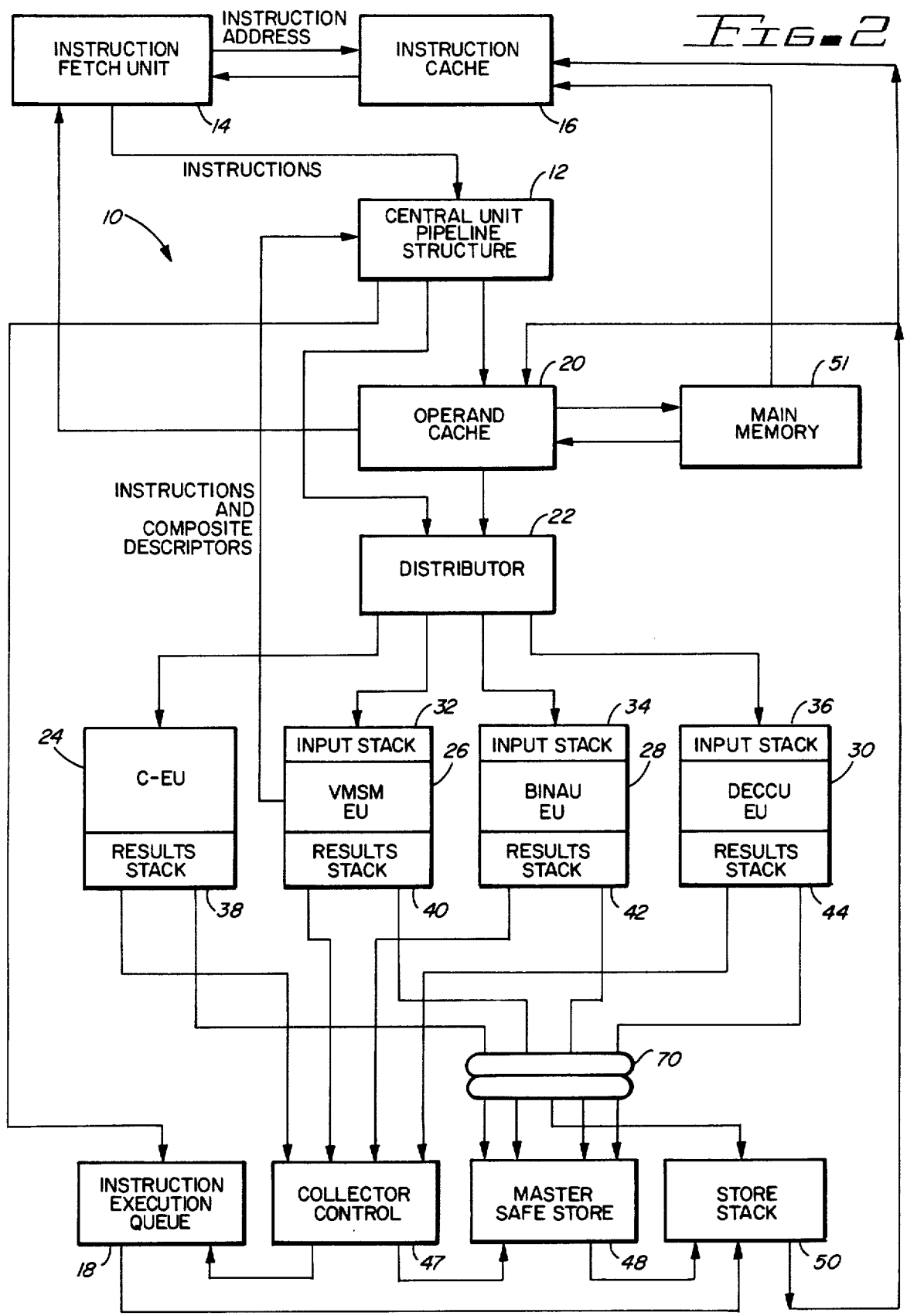

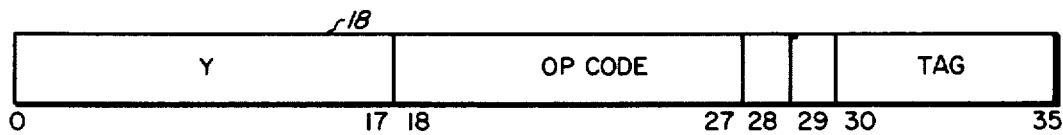
FIG-3
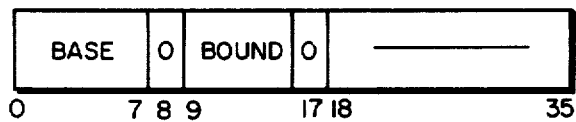
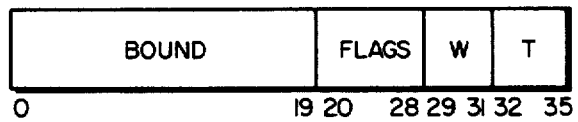
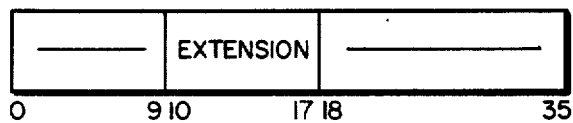
BASIC DECOR DESCRIPTOR
FIG-4A
VIRTUAL DECOR DESCRIPTOR
FIG-4B
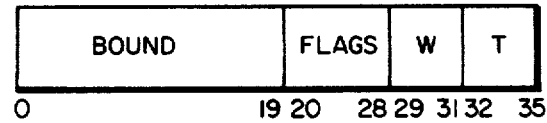
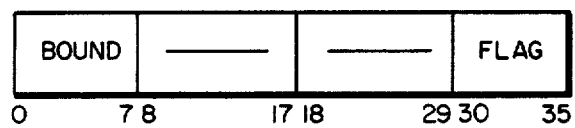
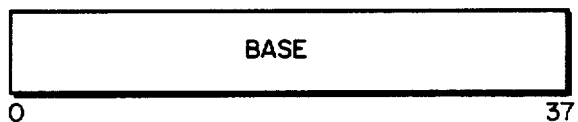
MULTICS DECOR DESCRIPTOR
FIG-4C
COMPOSITE DECOR DESCRIPTOR
FIG-4D ns and more particularly to data processing systems capable of processing data under control of a plurality of operating systems. Typically, however, each operating system has different addressing mechanisms as well as different attributes associated with the data fields of the operating system. The attributes and parts of the addressing mechanisms are included in data fields referred to as descriptors.

APPARATUS AND METHOD FOR PROVIDING A COMPOSITE DESCRIPTOR IN A DATA PROCESSING SYSTEM

BACKGROUND OF THE INVENTION

1. Field of the Invention

This invention relates generally to data processing systems, and more particularly to data processing systems capable of processing data under control of a plurality of operating systems. Typically, however, each operating system has different addressing mechanisms as well as different attributes associated with the data fields of the operating system. The attributes and parts of the addressing mechanisms are included in data fields referred to as descriptors.

2. Description of Related Art

It is known in the related art to utilize separate apparatus with each operating system of a data processing system. The necessity for separate apparatus was a result of the diverse manner in which each operating system can handle the address formation and the attributes associated with an operating system. Typically, each operating system will have a different descriptor format for providing address data and the associated attributes. As a result, even improvements in operating systems programs were constrained to function within the available apparatus, thereby severely limiting the possible alterations.

A significant problem results from the use of the descriptors. Descriptors are groups of data associated with the execution of instructions by the central processing unit. The descriptors typically include information necessary for address formation, but also include additional information about the data signal groups. The additional information can be unique to a particular operating system or it can be general in nature. For example, in the Multics operating system, the ring identification number can determine the user access to data and consequently must be retained whenever instructions in the Multics operating systen repetoire are executed.

Therefore a need has been present for a central processing unit which is able to utilize a plurality of descriptor formats without apparatus individualized to each of the operating systems. The central processing unit can, with additional modifications, be capable of control by a plurality of operating systems.

SUMMARY OF THE INVENTION

It is therefore an object of the present invention to provide an improved data processing system.

It is another object of the present invention to provide a data processing system that is not limited by the presence of a particular descriptor format.

It is another object of the present invention to allow a central processing unit to utilize format associated with a plurality of operating systems without use of apparatus specifically devoted to each format.

It is a more particular object of the present invention to provide apparatus for rearranging the data in a plurality of descriptor formats into a composite descriptor format.

The aforementioned and other objects of the present invention are accomplished according to the present invention by a VMSM unit including an input and output buffer unit, a control unit, a descriptor reconfiguration unit, a descriptor fetch unit and a descriptor master copy unit. The input and output buffer units provide synchronization of the entering and exiting instruction stream with activity of the remainder of central processing unit. The control unit analyzes each DATA (DATUM) entering the VMSM and controls the remainder of the VMSM unit apparatus to provide an appropriate response. If the incoming DATUM is a pointer, indicating an address of the actual descriptor, the VMSM unit activates the descriptor fetch unit to retrieve the indicated descriptor. If the incoming instruction is to reposition a descriptor in the descriptor stack in the addressing apparatus, the descriptor master copy (of the descriptor stack) unit is activated and the appropriate descriptor withdrawn from the descriptor master copy unit and forwarded to the appropriate descriptor stack position. If the entering instruction is a descriptor, the control unit determines the descriptor format and arranges the descriptor reconfiguration unit to rearrange the data of the incoming descriptor into a composite format.

These and other features of the invention will be understood upon reading of the following description along with the drawings.

BRIEF DESCRIPTION OF THE DRAWINGS

FIG. 2 is a block central processing unit including the VMSM execution unit of the present invention.

FIG. 3 is the format of a typical instruction stored in the data processing unit memory units.

FIG. 4A is a diagram of a typical basic decor descriptor format.

FIG. 4B is a diagram of a typical virtual decor descriptor format.

FIG. 4C is a diagram of a typical Multics decor descriptor format.

FIG. 4D is a diagram of a typical composite decor descriptor format.

DESCRIPTION OF THE PREFERRED EMBODIMENT

Figure 1:
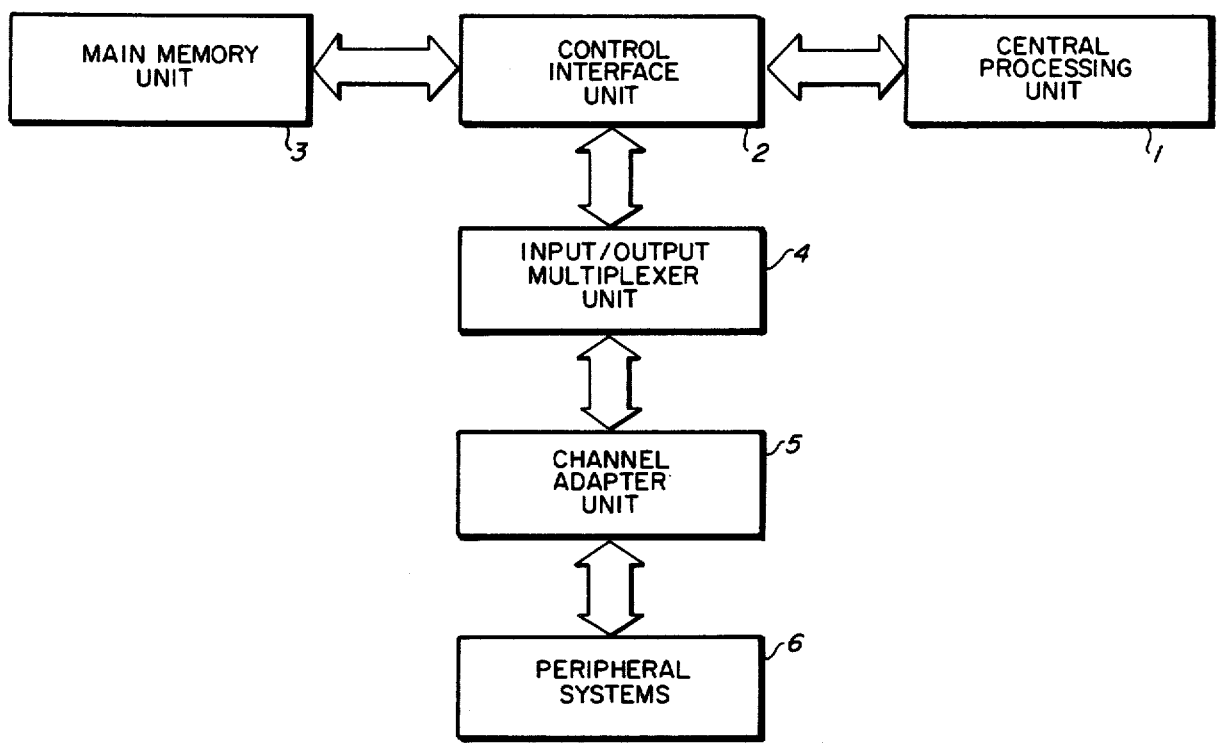
FIG. 1 is a block diagram of a data processing system.

Referring to FIG. 1, the central processing unit 1 is the principle portion of the data processing unit for the manipulation of information signal groups. The central processing unit includes a central unit for sequencing the entire unit and further includes a cache unit and an instruction unit. The cache unit obtains instruction signal groups and data signal groups from main memory unit 3 through the control interface unit 2. Instruction signal groups are retained in an instruction cache, oper- and signal groups in an operand cache and paging information in a paging buffer. The instruction unit stores prefetched instructions and signal groups in an instruction stack. The instruction represents the current instruction stream and prefetch alternate streams or indirect words predicted by the batch table. The instructions are decoded and operand or branch target instruction addresses generated in a pipeline which accepts instructions for an instruction stack. The final stage of the pipeline sends instructions and operands to one of a group of specialized execution units. The pipeline, address adder and instruction stack can be considered another logical execution unit, which handles transfer class instructions as well as instruction address, or state-related situations.

The main memory unit 3 provides the central processing unit 1 with the principle storage of information signal groups used by the central processing unit. The information signals are entered into or extracted from the main memory unit under control of the control interface unit 2.

The control interface unit 2 controls the transfer of information signals between the main memory unit 3, the input/output multiplexer 4 and the central processing unit 1. Thus, the control interface unit 2 prioritizes requests to the control interface unit and prioritizes the output to the input/output unit multiplexer. The control interface unit 2 provides a buffer unit for information signals transferred there through. In addition, the control interface unit 2 controls the queue for system interrupts under which words are stored in the main memory unit as well as other interrupt activity. The error detection and correction processes for data transferred into and out of the main memory unit 3 is contained in the control interface unit 2. The output interface unit also provides apparatus to insure that no block access conflict exists among hierarchy commands.

The input/output multiplexer 4 is utilized to satisfy the throughput requirements of the data processing system. The operating system prepares the required control words and assigns a buffer area for the data to be transferred. After the control words are prepared, the operating system initiates an input/output activity by issuing a connect instruction. The control interface unit 2 recognizes the connect instruction and passes the connect information to the input/output multiplexer controller. The input/output multiplexer retains the mailbox address and other pertinent information from the connect control word in the addressed channel's scratchpad memory and passes the connect command to the addressed channel in a channel adapter unit 5.

The addressed channel notifies the identified peripheral device that a channel program is waiting. After notification to the identified peripheral device, the channel adapter unit 5 requests the input/output multiplexer to pull the channel mailbox. In response to this request, the input/output multiplexer loads the first eight words of the channel mailbox into scratchpad memory. The channel program subsequently requests the input/output multiplex to 'move pointer forward'. In response to this request, the input/output multiplex performs a list service and sends the Instruction Data Control Word (IDCW) to the channel adapter unit 5. The first DCW of the channel program must be an IDCW. The channel adapter unit passes the IDCW to the peripheral device and, on demand from the peripheral subsystem, requests a data list service. Using the List Pointer Word (LPW) from the channel mailbox, the input/output multiplexer retrieves the next DCW. The input/output multiplexer retains the DCW in scratchpad memory and sends the pertinent information from the CDW to the channel adapter unit 5. With the DCW information, the channel adapter unit 5 requests the necessary data services to satisfy the channel program. The input/output multiplexer 4 executes the data services by maintaining the current DCW and PTW in scratchpad memory and performs any required list services for additional DCW's. After the channel program has been satisfied, the channel requests a status store service. The input/output multiplexer 4 places the termination status in the channel mailbox and restores the mailbox to memory. After completion of the status service, the channel requests a terminate interrupt service. In performing the service, the input/output multiplexer 4 interrogates the mailbox link word. If the interrupt inhibit bit is 'ON', the interrupt is not reported. If the interrupt bit is 'OFF', the interrupt is reported using the interrupt level specified in the mailbox link word. If the link word specifies a continuation, the input/output multiplexer issues a connect to the channel.

The channel adapter unit 5 provides the interface between the input/output multiplexer 4 and the peripheral subsystem 6. In addition to the activity described in relation to the input/output multiplexer, the channel adapter interface unit provides a logic implementation conversion, CML in the input/output multiplexer 4 and TTL in the channel adapter unit 5. The channel adapter unit 4 serves as a buffer device between the peripheral system 6 and the input/output processor, permitting the input/output multiplexer to transfer information efficiently and asynchronously with a multiplicy of peripheral system 6.

The peripheral system 6 can be any of that typical subsystem such as magnetic tape units, disc storage unit, terminal interfaces, etc. The peripheral subsystems serve as mass storage devices and devices to provide external communication with the data processing system.

Referring to FIG. 2, the major components, or subsystems, of central processing unit 10 of a large-scale general-purpose digital computer are illustrated. The central processing unit 10 can be an implementation of the central processing unit 1 of FIG. 1. The central pipeline unit, or structure, 12 controls the overall operation of processing unit 10. The instruction fetch unit 14 supplies, or transmits, the address of instruction words to instruction cache 16. In response to the receipt of an instruction address by instruction cache 16 from instruction fetch unit 14, an instruction double word is transmitted from cache 16 to instruction fetch unit 14 which stores, or accumulates, a series of instructions in an instruction stack which is a part of the instruction fetch unit 14. The central pipeline unit 12 obtains the instructions in program order from the instruction stack of instruction fetch unit (IFU) 14, preferably one per clock period of the system clock of processing unit 10. The central pipeline unit structure 12 is a 5-stage pipeline in which in the first stage the operation code, bits 18–27 of instruction word 18 illustrated in FIG. 3, is decoded and formation of the operand's address is started using the 18 bits denoted Y in FIG. 3, bit positions 0 through 17 bit 29 and the 6 bits denoted as TAG in FIG. 3. In the second stage, the address formation is completed. In the third and fourth stages, the directory of operand cache 20 is searched to determine if the operand is located in the operand cache 20, and the operand is accessed or obtained from the cache data storage. However, if the operand is not stored in the cache, then a block of eight words which contains the operand is fetched from main memory 51 and stored in the operand cache after sending the desired operand to the distributor. In the fifth stage, distributor 22 distributes, or dispatches, each instruction and its operand to the appropriate execution units, such as the central execution unit CEU 24, the virtual memory and security manager VMSM 26, the binary arithmetic execution unit BINAU 30, or the decimal character unit DECCU 32. In addition, the instructions and other relevant information, as will be described hereafter, are transmitted in program order to the instruction execution queue 18.

Each of the execution units 24, 26, 28, 30, is capable of receiving instructions and operands and of processing them independently of the other execution units. Each of the execution units 24, 26, 28, 30, includes logic circuits which are optimized for performing the set of instructions assigned to it. In the preferred embodiment, central execution unit 24 performs basic computer operations, such as simple loads, adds, subtracts, etc., and certain miscellaneous instructions. The central execution unit 24 is unique among the four execution units 24, 26, 28 and 30 in that it executes each instruction as received, usually within one clock period. As a result, the central execution unit 24 is not provided with an input stack as are the other execution units illustrated in FIG. 2. The virtual memory and security manager unit 26 executes instructions relating to virtual memory, security and special instructions that are peculiar to a secure operating system. This unit also provides a composite descriptor for each descriptor provided to the central processing unit. The BINAU execution unit 28 executes binary arithmetic instructions, such as multiply, divide and floating point instructions. The decimal/character execution unit 30 executes alphanumeric, decimal arithmetic, and bit string instructions. Execution unit 26 is provided with, or has associated with it, an input stack 32; execution unit 28 has provided with it an input stack 34; and execution unit 30 has two input stacks 36 associated with it. The function of input stacks 32, 34 and 36, is to store the operation code and operands of the instructions awaiting execution by each input stack's associated execution unit.

Each of the input stacks 32, 34 and 36, is a conventional first-in, first-out stack having 16 levels, with each level adapted to store a double data word. In the preferred embodiment, each word has 36 bits so that a double word has 72 bits. In addition, an execution code derived from the operation code of the instruction word to be performed or executed is stored with the operand in the input stack. The input stacks 32, 34 and 36 of execution units 26, 28 and 30 are fifo, or first-in, first-out stacks, so that the first operation code and operand required for each operation code applied to a given execution unit is the first one read out of the input stack for execution by that unit. Each of the execution units is also provided with a results stack. Results stack 38 is associated with the central execution unit 24, results stack 40 is associated with VMSM execution unit 26, results stack 42 is associated with the binary execution unit 28, and results stack 44 is associated with the DECCU execution unit 30. In the preferred embodiment, the results stacks are conventional first-in, first-out stacks, each of which has 16 levels. The results of the operation of an instruction are stored in the stacks in the order in which they are executed. Each level of a results stack has the capability of storing a double word, as well as additional information with respect to the double word. The operational code of each instruction word in execution, along with other information, is a part of an instruction execution queue word (IEQ) which is stored in the execution queue 18 which, in the preferred embodiment, is a conventional first-in, first-out stack of 16 levels.

An important feature of the central processing unit 10, from the standpoint of performance, is that both the operand cache 20 and the instruction cache 16, which together form a cache unit, and the main memory 51 perceive the address space as being composed of blocks of eight 36-bit words. All data transfers between the main memory and the caches 20 and 16 are in units of eight such words or blocks. Movement of data within the processing unit 10, particularly between the cache units and the execution units, is on a double word, or pair, basis and only the double word required is so moved. The distributor 22 supplies operands from the cache 20 to the various execution units and maintains multiple copies of the AQ register, one set for the central pipeline unit structure, the CUPS and BINAU only. The instruction fetch unit 14 consists of an instruction prefetch pipeline of five stages. Instruction fetch unit 14 stores prefetched instructions and data in its instruction stack. The instructions represent the current instruction stream and one or more prefetched alternate streams or indirect words predicted by the transfer/indirect prediction table of unit 14. The instruction fetch unit supplies instructions to the central pipeline unit 12. In central pipeline unit 12, instructions are decoded during the I, or instruction, cycle of central pipline unit 12. Instruction prefetch pipeline 14 does not examine the instruction operation codes of instructions prefetched by it, but rather uses the instruction count of its instruction counter register to search the transfer and indirect prediction table to determine if a given instruction is a branch to a new memory location or is an instruction requiring indirect addressing.

The instruction prefetch pipeline provides the instruction execution pipeline 12 with a supply of instructions to be executed. This is accomplished by use of a transfer and indirect prediction table to predict new instruction sequences and then to prefetch the instructions of the new instruction stream, two words at a time, from the instruction cache or occasionally from the operand cache and placing such instructions or indirect words in the instruction stack. Loading such new instruction sequences into the prefetch instruction stack occurs only if the transfer/indirect prediction table indicates that one such instruction of each pair was a successful transfer, or required an indirect cycle the previous time the instruction was executed. When this occurs, instruction prefetch pipeline 14 diverts the current instruction sequence to fetch the target word of the transfer instruction or indirect instruction. Otherwise, the instruction prefetch pipeline continues sequentially fetching instructions and placing them in its instruction stack. The instruction prefetch pipeline of instruction fetch unit 14 also returns to sequential prefetching if the predicted transfer instruction turns out to be a nontransfer when the instruction in question is actually executed. The prefetched transfer or indirect targets are available for processing by the central unit pipeline structure 12 as soon as they are fetched and stored in the instruction stack of the instruction fetch unit 14. Thus, it is not necessary to wait for the actual execution of a transfer or indirect instruction by the central pipeline structure unit to be completed before IFU 14 starts placing instructions of the new instruction stream in the instruction stack of IFU 14. In this way, the effective execution time of transfer instructions and instructions with indirect operands is minimized.

The instruction prefetch pipeline operates in five cycles in a manner similar to the five cycles of the central pipeline unit 12. One difference is that IFU 14 disposes of instructions by placing them in its instruction stack a double-word pair at a time whereas CUPS 12 disposes of instructions one word at a time by forwarding them to central execution unit 24 or to the input stacks of the execution units 26, 28, and 30. Another difference is that IFU 14 checks with its transfer/indirect prediction table to determine if a transfer or indirect address is to be executed, whereas the central pipeline unit structure updates the transfer/indirect prediction table of IFU 14. During the first cycle or stage of the instruction prefetch pipeline of IFU 14, the instruction counter of central processing unit 10 is incremented by two. During the second cycle, the address of an instruction pair is distributed to the transfer/indirect prediction table and the instruction operand caches. During the third cycle, the transfer/indirect prediction table and instruction cache 16 are accessed. The instruction cache access consists of a set of double words, four in the preferred embodiment, plus a physical page address denoting the physical system memory location associated with these double words. During the fourth cycle, the physical page address of the desired instruction pair is compared with the page address of each of the cache-accessed double words. If a match occurs, the double word associated with the match is selected as the instruction double word. If no match occurs, the operand cache is searched for the instruction double word. If the instruction double word is found neither in the I cache nor the O cache, an 8-word block containing the desired instruction double word is fetched from the main memory 10 and placed in the instruction cache. The transfer/indirect prediction table is accessed in order to see if either or both of the instructions being accessed is predicted to be a transfer/go instruction during the compare/select or fourth cycle. The instruction pair is selected from one of the four cache levels corresponding to a match of the real page number from the directory of the current instruction stream. The instruction pair read out of the cache is saved in an instruction fetch register, the real page number is saved, and the response from the transfer/indirect prediction table is checked to see if either of the instructions is recorded in the transfer/indirect prediction table as a transfer/go. Note that the response from the transfer/indirect prediction table arrives two cycles after it is interrogated. During the execution cycle, the fifth cycle of the prefetch instruction pipeline, the instruction pair is placed in the instruction stack so that, if the transfer/indirect prediction table indicates that either of the instructions is a transfer, the instruction prefetch pipeline will prepare to fetch instructions from the new instruction stream. The timing is such that up to two extra double-word pairs from the current instruction stream will also be read from the cache. In the event the predicted transfer/go turns out to be a no go, the extra double-word pairs are still available in the instruction stack. Pointers associated with the instruction stack enable central instruction prefetch unit 12 to read instructions out of the instruction stack in the correct sequence, or in program order.

The instruction stack functions as an instruction queue between instruction prefetch unit 14 and the instruction execution unit or central unit pipeline structure 12. In the preferred embodiment, the instruction stack is 15-levels deep. Once instructions or indirect words are placed in the instruction stack by the instruction fetch unit pipeline structure, they remain until they are executed or until it is determined that they are not to be executed. In the case of a transfer instruction or instructions requiring an indirect word for which a history is found in the transfer/indirect prediction table during prefetch, the instruction stack control contains a pointer to the instruction stack location holding the address of the target instruction, or of the indirect word. The instruction stack is a cyclic round-robbin stack. There is a sixteenth entry which is used to buffer instruction double-word pairs. Instructions and indirect words or operands flow from the instruction stack of IFU 14 to the central pipeline unit structure 12 through the base instruction register of central unit 12 a single word at a time.

Central pipeline unit 12 also has five stages or cycles. In the first, the operation code of the instruction is decoded and formation of the operand address is started; in the second, the operand address is completed; in the third, the address is converted from a virtual memory address space representation to the actual physical address space representation, and a set of candidate operands is accessed from the operand cache along with the physical page number identifying the system memory location from which each of the operand candidates was accessed; in the fourth, the operand page number portion of the physical address is compared with the page number associated with each of cache accessed operand candidates and assuming there is a match; in the fifth, the selected operand and execution command code is transmitted to the execution unit uniquely capable of performing the instruction. It should be mentioned that some of the activities carried out are skewed across the pipeline stages as defined. It is the central pipeline unit structure 12 that makes entries into the transfer/indirect prediction table of IFU 14. Whenever the central pipeline unit structure executes a transfer-go instruction, the central pipeline unit structure 12 verifies any corresponding entry which may be in the transfer/indirect prediction table. If a predicted transfer turns out to be a no-go or nontransfer, then that entry in the TIP table is deleted. In the case of an impure procedure, for example, the target address of the transfer instruction has been modified, but the operational code still remains a transfer; the appropriate entry in the transfer/indirect prediction table is corrected to reflect this fact. In the event of a transfer-go not previously recorded, a new entry is made in the TIP table which may displace another entry should all four levels corresponding to the instruction counter for that particular instruction be occupied. The displacement algorithm is random since there is little benefit in adding the necessary complex circuitry to displace the least recently used entry because of the infrequency of transfer/indirect prediction table misses. The central unit interacts with the transfer/indirect prediction table in other ways. In the case of impure procedure where the operation code is changed but the transfer/indirect prediction table still predicts a transfer, the central pipeline unit structure 12 will detect the fact in the instruction cycle where the instruction is first decoded. In the case of indirect instructions, the central pipeline unit structure 12 also makes an entry into the transfer/indirect prediction table for these. The instruction execution pipeline 12 has the critical role in central processing unit 10 in achieving the necessary high levels of performance as any interruptions due to data not being in the cache unit, unexpected transfers, etc., will halt the operation of the central pipeline unit until such occurrences are remedied.

The transfer/indirect prediction table consists of 4,096 entries which are divided into 1,024 sets of four entries each. The TIP table serves to record the target address for the first level of indirection and also to predict the target address for both conditional and unconditional transfers. During the first execution of a successful; i.e., transfer-go instruction or an instruction requiring an indirect word, there will be a break in the pipeline of the central pipeline structure, while the target address is formed and the target acessed from the cache. On the first execution, information is prepared for the transfer/indirect prediction table defining the location of the target instruction in the cache unit. During the next prefetch of the transfer instruction or instruction requiring an indirect word, the prefetch pipeline accesses the transfer/indirect prediction table and determines the target location in order to also prefetch the alternate instruction stream or indirect word. Checking the transfer or indirect instruction occupies only one clock period of the central pipeline unit in order to verify that the prefetch target address has not changed. During subsequent executions of any transfer instruction, the transfer/indirect prediction table entry is updated only if the transfer does not go as expected. The transfer/indirect prediction table keeps track of only one level of indirection. The cache addresses of indirect words are put in the TIP table only if the indirect words are not modified.

The cache unit consists of two separate 8K caches, instruction cache 16, and operand cache 20. Data is maintained in each cache on an eight-word block basis. A block consists of eight consecutive 36-bit main memory words, the first word of which has an address of 000 in binary notation. A reference to any word in a block causes the entire block to be read from main memory, unless the block is already in the appropriate cache. Any block in a cache is retained until it is displaced by another block or until it is cleared from the cache by a cache clearing instruction. The instruction cache 16 holds blocks of unmodified instructions and indirect words, while the operand cache holds blocks of operands, modified instructions and indirect words. Operand data cannot be fetched from the instruction cache nor can data be modified in the instruction cache. It is, however, possible to fetch instructions from the operand cache, but the normal and desired mode of operation is to fetch instructions from the instruction cache only. If a block which is contained in the instruction cache is referenced for a store or data fetch operation, that block is cleared from the instruction cache and refetched from main memory 51 and placed in the operand cache 20. In summary, operands are fetched only from the operand cache and they may be stored only into the operand cache. Instructions may be fetched from either cache, but there is a performance preference for the instruction cache.

Each cache has a four-level set associative directory for the accompanying storage for 8K 36-bit words. Each cache is organized as 256 rows of four 8-word blocks. The first eight words of physical memory map onto the first row of the cache, row 0. Words 8 through 15 on the second row, row 1, etc., with words 2,040 to 2,047 mapping onto the last row, row 255. Each successive 2K of physical memory maps onto the cache in a similar manner. Hence, the cache row number of an eight-word block is known from its physical memory address. Since each row has space for four 8-word blocks, in four levels, the levels for a particular row in a given cache unit will be filled before there is a contention for space in that row. After all levels in the row have been filled, older blocks in the row are displaced on a least recently used basis. Thus, five hits to the same row are required before an incoming block of eight words can displace a prior block of eight. If an eight-word block of instructions is in the operand cache, instruction prefetch unit 14 can fetch the instructions from the operand cache a double-word pair at a time, but without removing them from the operand cache. Usually, the instruction prefetch unit 14 runs far ahead of the instruction execution pipeline of the central pipeline unit structure 12, so this penalty is not always visible, but such a situation can cause an instruction prefetch pipeline to fall behind, in which case the lack of the proper instruction will result in a break in the pipeline of the central pipeline unit structure. Performance is enhanced by a store into cache as distinguished from a store through cache. All store operations go to the operand cache, but do not immediately go to main memory 51, although displacing the block in which the store occurred will force the writing of that block to main memory 51 (i.e. main memory unit 8 in FIG. 1). If the block being stored into is already in the operand cache and control information indicates that the eight-word block has already been modified, then the store is completed to the operand cache and no further action is taken. However, if the block is found in the operand cache, but has not yet been modified, central processing unit 10 notifies the control interface unit 2 associated with that block that the block is being modified. The control interface unit then issues a write notification to any other central processor units which may be present. These must then invalidate any copies of the eight-word block which they might have either in their operand cache or conceivably in their instruction cache. When a data block is not found in the operand cache on a store operation, the block is fetched from memory. Central processing unit 10 indicates to the control interface unit 2 that the fetch is for the purpose of modifying the block so that, when the processor receives the block, the block can be modified without any further communication between units. Only read cache misses cause the pipeline of the central pipeline unit structure to wait for data. On store cache misses, the pipeline continues without waiting for data.

Each cache has a duplicate directory, so that, when a system request is received to either clear a block or to transmit a block to system memory, the processor can search its duplicate cache directory to determine if the block is present without interfering with the operation of the central pipeline unit 12. If the requested block is found, then the processor takes the appropriate action. Otherwise, the duplicate directory responds to the request and the processor is not delayed.

The central unit pipeline structure 12 forwards the operation code of each instruction as it is received, in program order, to the instruction execution queue 18 for storage therein. Up to sixteen instruction execution queue IEQ words can be stored in queue 18. Collector control 47 uses the operation code of each IEQ word to control the reading out of the results located or stored in the results stacks 38, 40, 42 and 44 of each of the execution units 24, 26, 28, and 30, so that the results in proper program order can be stored in either the master safe store MSS 48 or into store stack 50. Results that are stored in store stack 50 are for writes of operands to memory. Instructions which change program addressable registers of central processing unit 10 generate results that are stored in the master safe store 48 so that at such time as an interrupt, a fault, or a hardware error occurs, the contents of the program addressable registers of the central processing unit unit 10 are available in master safe store 48. The availability of current and valid contents of all program addressable registers greatly facilitates fault recovery, handling of interrupts, and retrying of instructions as appropriate. The main memory 51 of the data processing system of which the central processing unit 10 is a subsystem provides instructions for the instruction cache 16 and operands for operand cache 20. All stores or writes to main memory 51 are from data stored in the operand cache 20. Thus, whenever data is to be written into memory as a result of an execution of an instruction, the necessary data, operands, are stored in store stack 50 in program order and are issued or written into the operand cache 20 in program order. As a block of operand cache 20 is released so that new data can be written into that block, the operand cache control will have data in that block of cache written into main memory 51 before new data is written into that block.

The central pipeline unit 12 controls the overall operation of processing unit 10 and has the function of sending operation codes or commands and associated operands to the various execution units 24, 26, 28, and 30, where the actual execution of each operand code is performed. Instruction fetch unit 14, under the control of the central pipeline unit 12, fetches instructions primarily from the instruction cache 16 and loads up to sixteen pairs of instructions in an instruction stack which is a part of unit 14. The central pipeline unit structure 12 obtains the instructions from the instruction stack of the instruction prefetch unit. The central pipeline unit 12 prepares the addresses of the operands in a series or sequence of five steps from the operand cache and sends the operation code and the operands to whichever one of the execution units 24, 26, 28, or 30, which has the capability of executing the same. Within the central pipeline unit structure 12 is performed the instruction preprocessing, instruction decode, operand address formation, including paging and search of an associative memory of the operand cache.

The execution units 24, 26, 28, and 30, receive commands from the central pipeline unit 12 and operands from the operand cache 20 which are distributed by distributor 22 to the various execution units. The execution of an instruction generally involves the formation of some result based upon current register contents and the input operand which produces a change to a program visible register or to memory.

Central processing unit 10 is provided with four major execution units, each of which is made up of one or more subunits. These units are the central execution unit 24, the binary arithmetic unit which performs floating point and multiply and divide instructions BINAU 28, the decimal character unit DECCU 30, and the virtual memory and security manager unit VMSM 26. Each of the execution units 24, 26, 28 and 30, receives instructions and operands, and then processes them independently of what any of the other execution units may be doing. Execution units 26 and 28 each have an input stack 32 and 34, a sixteen-level fifo stack with each level of the stack capable of holding one double word. Execution unit 30 has two sixteen-level fifo stacks 36, each capable of holding one double word. A double word in the preferred embodiment comprises 72 bits plus parity bits.

In addition, each execution unit has an associated command stack. Execution units 26 and 28 can hold up to 16 commands awaiting execution while execution unit 30 can hold up to 4 commands awaiting execution. It should be noted that the decision as to which execution unit received or is assigned a given instruction and its associated operand is determined by the central pipeline unit 12 by examining the operational code of each instruction. The particular method used in the preferred embodiment is a conventional table lookup technique. Input stacks 32, 34 and 36, allow the central pipeline unit structure 12 to issue operands and associated operation codes to the execution units at a maximum rate of one per clock period, without waiting for the completion of the execution of preceding multiple execution cycle instructions, for example. Such an arrangement also allows execution of instructions in the different execution units to be overlapped. Each instruction code is always executed in the order it is received from the central pipeline unit 12. The system architecture of processing unit 10; i.e., having several execution units, requires that several copies of the major registers, for example the A and the Q, be kept. As processing proceeds, the valid copy of a particular register may be in any one of the execution units or in any of several different register banks within processing unit 10. Central pipeline unit structure 12 maintains a record of the currently valid copy for each register and recognizes when the execution of the next instruction requires transferring a copy of the contents of a register from one execution unit to another. However, maintaining a valid copy of the contents of a particular register is complicated by the length of pipeline 12, which is five instructions or clock periods deep. The ability to determine the contents of each addressable register immediately prior to the occurrence of a fault is a requirement for prompt recovery from a fault.

In any pipeline computer, processing of any one instruction is overlapped with the processing of several other instructions in different stages of execution. In addition, in central processing unit 10 several instructions may simultaneously be executed in different execution units. As a result, at any one time, the registers of pipeline 12 and of execution units 24, 26, 28, and 30 can contain register changes resulting from the processing and, execution of several different instruction codes. When an instruction program fault, instruction processing error, or an interrupt occurs, the collecting apparatus including units 38, 40, 42, 44, 70, 18, 47, 48 and 50 must be halted at the end of the last successfully completed instruction. All register changes as a result of the execution in program order of instructions prior to the fault, error, or interrupt should be completed and any program visible register change or changes to memory as a result of execution of later in program order instructions must be cancelled or deleted. The collecting apparatus provides a valid, current copy of each of the program addressable registers to facilitate fault and error recovery and for handling interrupts. A record of the proper program order for all instructions in execution being processed by central processing unit 10 is maintained in instruction execution queue 18. Instruction execution queue 18 contains one entry for every instruction in process. Entries into the master safe store 48 and into store stack 50 are ordered so that they are unloaded in proper program order; i.e., the same order or sequence in which the instructions are stored into the instruction execution stack 18 by the central pipeline unit's distributor 22. The instruction execution queue words contain the operation code of the instruction and identify by means of a table lookup technique the execution results stack in which the result of that instruction when executed is, or will be, entered. The result of each instruction executed is then transferred from the appropriate results stack to master safe store 48 or to store stack 50 in program order. Thus, in the collecting apparatus, instructions are completed and the results of each are received and arranged in the proper or program order. The collecting apparatus also performs the actual execution of all memory store instructions. Master safe store 48 contains a copy of all program visible registers so that it is a convenient place to obtain the contents of program visible registers which are to be written into memory. Handling store instructions in the collecting apparatus with the data to be written into memory 51 coming from either master safe store 48 or the execution units' results stacks via store stack 50 maintains program order and avoids the necessity for the execution units 24, 26, 28 and 30 from being involved in store instructions. Thus, in this sense, the collecting apparatus is another execution unit for processing store instructions. As a result, simple stores can be overlapped with the execution of other instructions taking two or more clock periods. The information stored in the master safe store 48 makes it relatively easy for the central processing unit 10 to retry hardware instructions where deemed necessary.

Referring next to FIGS. 4A, 4B, 4C, and 4D, examples of descriptors used by various operating systems as well as the composite decor descriptor are shown. The descriptor for the basic decor is shown in FIG. 4A. This descriptor includes two 36 bit data fields. In the first data field, bits 0-7 represent a base number, bits 9-16 represent a bound number and the remaining bits are not relevant to this discussion. In the second data field bits 10-17 are the extension number and the remainder of bit positions are not relevant to this discussion. In FIG. 4B, the virtual decor descriptor including two 36 bit fields are shown. In the first 36 bits, bits 0-19 represent the bound, bits 20-28 represent flags, bits 29-31 are the working space register (WSR) and bits 32-35 are the type of descriptor. In the second 36 bit field, all bits are used to represent a base address. In FIG. 4C, the Multics decor descriptor is represented by two 36-bit fields. In field one, bits 0-25 are the page table base address, bit 26 is a flag and bits 27-35 have ring-access information. In the second field, bits 0-7 represent the bound, bits 30-35 represent flags and the remaining bit positions are not relevant. In FIG. 4D. the composite decor descriptor produced by the VMSM unit includes a 36 bit field and a 38 bit field. In the first field bits 0-19 are a bound number, bits 20-28 are flags, bits 29-31 are a working space register and bits 32-35 are a type of descriptor identification. In the second field, the entire 38 bit field is available for a base address.

Figure 8:
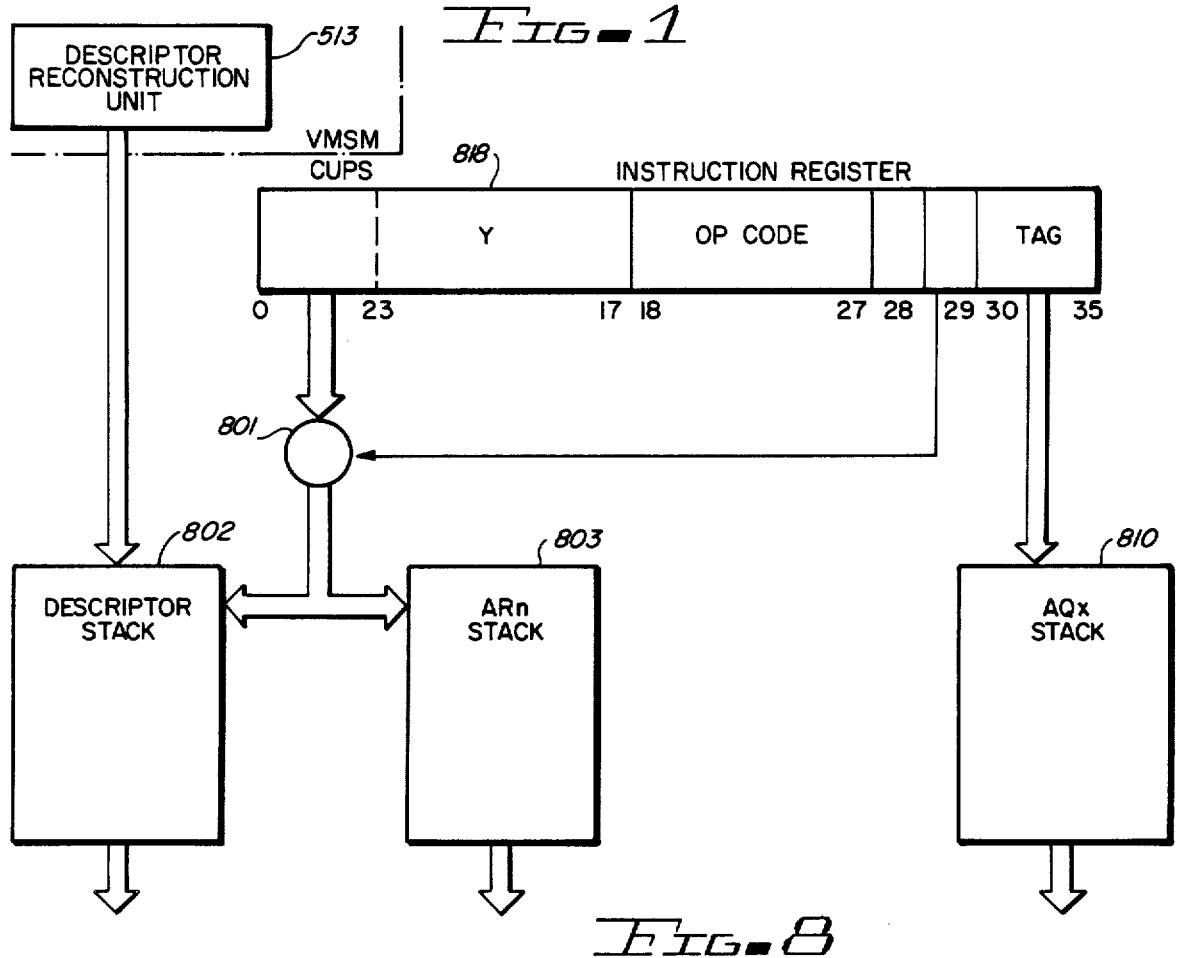
FIG. 8 is a block diagram of a portion of the apparatus forming the effective address to illustrate the location of the descriptor stack.
Figure 5:
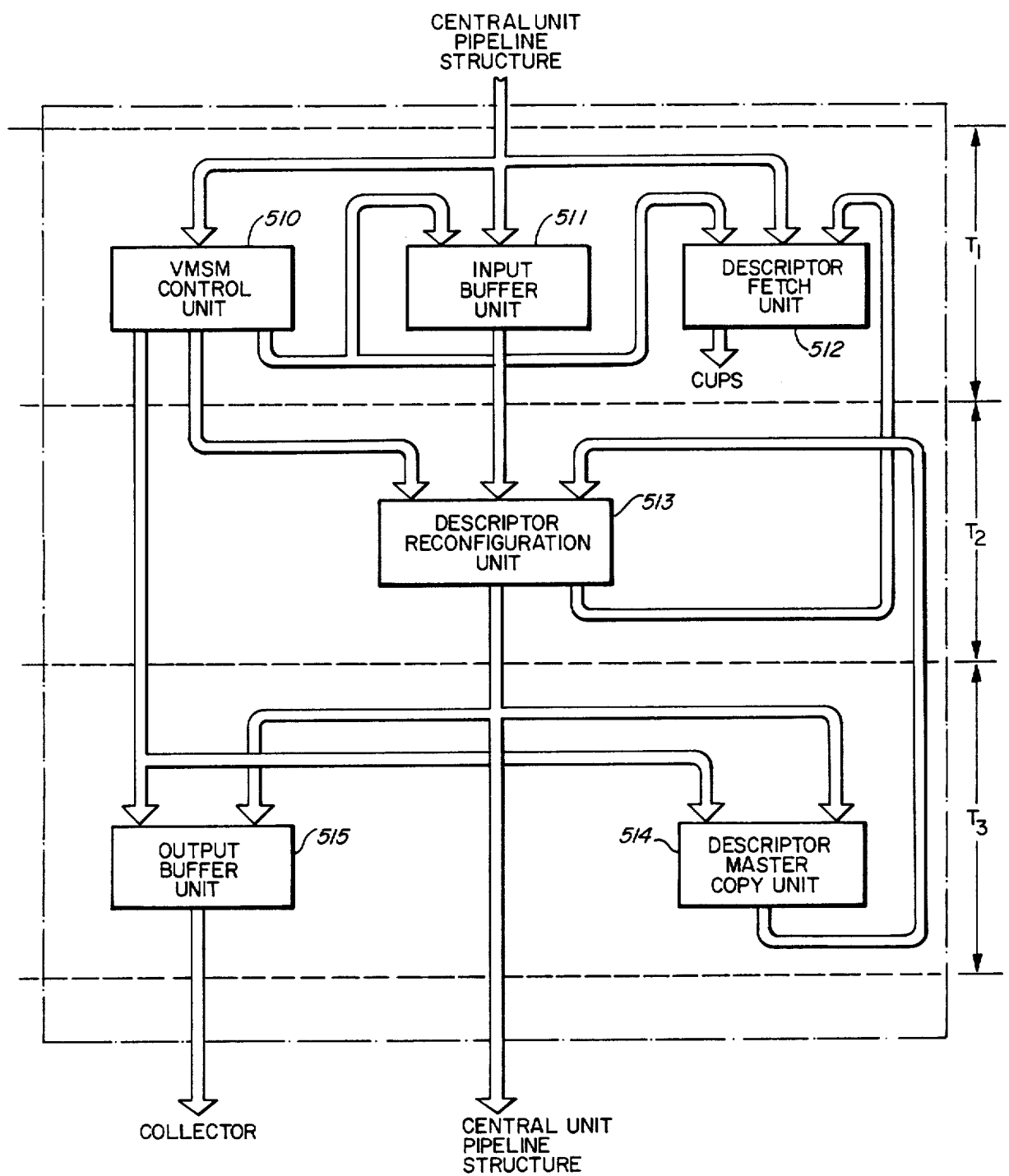
FIG. 5 is a block diagram of the principle components of the VMSM unit.

Referring to FIG. 5, a block diagram of the VMSM unit is shown. A double word (2×40 bits 36 bits plus parity) is transferred from the central unit pipeline structure to the VMSM unit and applied to the input buffer unit 511 and the descriptor fetch unit 512. The input buffer unit 511 consists of a first-in-first-out stack with 16 locations to synchronize the operation of the VMSM unit with the execution speed of the central unit pipeline structure and the VMSM unit. A 14-bit execution code is transferred from the central unit pipeline structure to the VMSM unit and applied to the VMSM control unit 510. The execution code is analyzed by the VMSM control unit 510. In general, three types of operands can be received by the VMSM unit, a descriptor, or a pointer to a descriptor, or a descriptor position update operand and the type of operand is uniquely determined by this given execution code.. If a pointer to a descriptor is identified, the control unit 510 informs the descriptor fetch unit 512. The descriptor fetch unit, in response to the double word pointer and the signals from the control unit, creates a read instruction, and sends this instruction to the central unit pipeline structure to bring the descriptor referenced by the pointer to the VMSM unit. When the double word entering the VMSM unit is a descriptor, the control unit 510 analyzes the execution code to determine, from the format, to which operating system the descriptor belongs. Having determined the decor to which the descriptor belongs, the control unit 510 adjusts, or controls, the logic in the descriptor reconfiguration unit 513 in a manner determined by the identified decor. The original descriptor is thereafter reformatted into the composite descriptor format and applied directly to the addressing apparatus in the central unit pipeline structure (c.f. FIG. 8). After formation of the composite descriptor, the control unit 510 adjusts, or controls, the logic in the descriptor reconfiguration unit 513 to generate the unformatted or decor-dependent descriptor or regenerate the original operating system (O.S.) descriptor which is required to maintain the program-visible data formats associated with said O.S. descriptors. The O.S. descriptor generated by the descriptor reconfiguration unit 513 is then simultaneously applied to the output buffer unit 515 and the descriptor master copy unit 514. The output buffer unit 515 includes a first-in-first-out stack for providing for the non-synchronous operation of the components of the remainder of the central processing unit with the VMSM unit. The O.S., are unformatted descriptor is then transferred to the collector for distribution to the data processing system. The descriptor master copy unit 514 is a content-addressable register bank containing a local copy of all the program-visible descriptor registers for use in the descriptor reconfiguration unit 513 of the VMSM. When a position update of the descriptor stack is identified, the descriptor master copy unit 514 which includes a copy of each descriptor will be accessed and the desired O.S. descriptor will be extracted and applied to the descriptor reconfiguration unit 513. The control unit 510 will have been informed of the request to update and will have prepared the combinatorial logic of the descriptor reconfiguration unit. The O.S. descriptor extracted from the descriptor master copy unit 514 will first be reformatted into the composite descriptor format and applied to the central unit pipeline structure addressing apparatus (c.f. FIG. 8). The logic in the descriptor reconfiguration unit 513 is then adjusted and the original O.S. descriptor is produced. This regenerated O.S. descriptor is then applied to the output buffer unit 515 and the descriptor master copy unit 514 as previously described. The updated descriptor will be transferred to the output buffer unit 515 for transfer to the collector. In addition to controlling the combinatorial logic, the control unit 510 controls the apparatus sequencing, stack addressing and appropriate switch positions for sequencing of the pipeline operation of the VMSM unit as indicated by time intervals $T_1$, $T_2$, and $T_3$.

Figure 6:
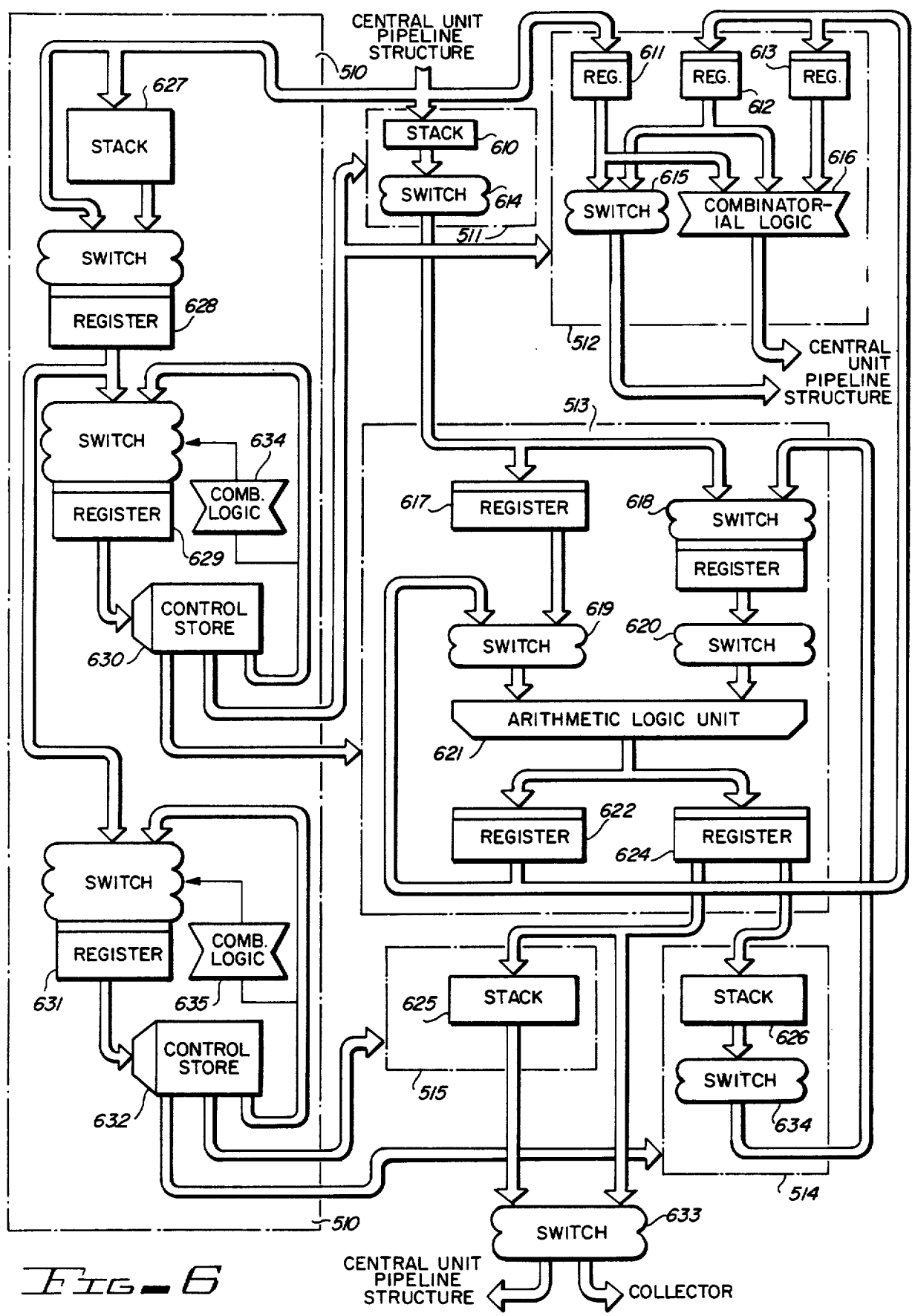
FIG. 6 is a schematic block diagram of the components of the VMSM unit.

Referring to FIG. 6 and beginning with the input buffer unit, register stack 610 is a double word wide, 16 deep first-in, first-out (FIFO) stack that is used to hold operands sent to the VMSM unit by the central unit pipeline structure 12, as illustrated in FIG. 2. Register 611 is the register used to hold the SEGID (segment identification) portion of an operand for the virtual decor and it also holds the segment number portion of an operand in the Multics decor. Register 612 represents an alternative data path to get information from the descriptor reconfiguration unit 513 into the central unit pipeline structure. Register 613 is used to hold a constant that is used in the decode of the SEGID or segment number. Switch 614 is coupled to the output of the data stack 610 and provides word alignment, i.e., the ability to switch the upper and lower words. Switch 615 is used when the VMSM unit generates an instruction to be inserted in the central unit pipeline and selects between the field specified by the SEGID or segment number. Register 612 can be an alternate method to generate an instruction to be inserted into the pipeline. The block of combinatorial logic 616 is the apparatus that performs the decode of the virtual decor SEGID field or the Multics segment number field and this logic is used to determine if the desired segment descriptor is currently within the VMSM master copy unit 514 or if the descriptor must be fetched from memory. The descriptor reconfiguration unit 513 register 617 is used to hold input operands that are typically the output of the stack 610. Register 618 is used to hold a descriptor and the input to register 618 is a one-of-two switch that allows the VMSM unit to select either a descriptor that may have been fetched by the central unit pipeline structure and loaded into the data stack 610, (or in the situations where the SEGID/segment number field references a descriptor in the VMSM master copy 514, the descriptor is accessed from the descriptor stack 626). The descriptor reconfiguration unit 513 includes the switches marked 619, 620 and the arithmetic logic unit 621. These three components take all these various operating system descriptors and reconfigure (those descriptors) into the composite descriptor format illustrated in FIG. 4D. These three components also preserve the decor-dependent descriptor formats used to generate unformatted descriptors. Register 622 contains a copy of the output of the arithmetic logic unit and can be used to save temporarily a particular part of the descriptor. Register 622 is also coupled to switch 619. After the composite descriptor has been generated in the arithmetic logic unit 621, this descriptor is stored in register 624. This register holds the entire composite descriptor and also the normal decor dependent descriptors. As the VMSM unit processes these instructions that will modify the descriptor registers, the VMSM unit transforms the decor-dependent descriptor format into the composite descriptor and the composite descriptor is then loaded into the central unit pipeline structure address hardware. In addition, the VMSM continues to use the decor-dependent descriptor in that format (i.e., the unformatted form) in all the internal registers. For instance, when a virtual decor descriptor is accessed and the descriptor converted into a composite descriptor, only the composite descriptor goes to the central unit pipeline structure. The VMSM unit contains a local copy and all the other register copies of that descriptor in the machine are stored in the decor dependent format, to make the descriptor appear to software program to be in the format that program can interpret. Only the addressing hardware in the central unit pipeline structure uses the composite descriptor. After the composite descriptor or the normal one is formed, the descriptor is loaded into the register marked 624. From register 624, there are three data paths that that descriptor can utilize. If the descriptor is a composite descriptor, it will be sent over to the central unit pipeline structure to be loaded in the descriptor stack (c.f. FIG. 8). This path exits from register 624 through switch 633 and finally to the central unit pipeline structure.

The other format of the descriptor is the noraml decor dependent format and it uses two other data paths. One path marked 626 is a register file or a content addressable register bank and again is 80 bits wide, (i.e. 2 words) and holds 16 descriptors and the descriptors are loaded into that register file in a predescribed manner such that their contents can be addressed and used later. That stack is known as the descriptor master copy unit 514 and a double word is transferred through the alignment switch 634. This switch is similar to switch 614 in that it provides word alignment, i.e. lets the upper word be switched with the lower word. That double word output of the switch 634 serves as an input into the descriptor reconfiguration unit 513. This path is used in the situations where the virtual decor SEGID or the Multics segment number references a descriptor that is already contaned in the VMSM unit as determined by the decode logic 616. For these situations, the descriptor will be read out of the descriptor master copy stack 626, gated through switch 634, and loaded into the input registers 618 in the descriptor reconfiguration unit 513. The second data path used by the decor-dependent descriptor utilizes the VMSM results stack 625 (c.f. FIG. 2.40). The collector contains a master copy of all the program visible registers in the machine so any time any execution unit changes a program visible register, the collector is notified of the results in order to update its copy of the program visible registers. The mechanism to do that is provided by the result stack 625. This is a double word wide, 16 deep, FIFO stack where the VMSM unit controls the loading of data into this stack and the collector controls the retrevial of this data. The VMSM unit stores the results as it generates them, taking the output result in register 624 and loading it in the stack 625. The collector controls the reading of the results and will read out results as a given instruction is being processed. The output of register stack 625 goes through switch 633 and into the collector. The double word wide data output that comes from the VMSM is transferred to two locations, to the central unit pipeline structure and the collector. The switch 633 is used to multiplex the given data to these two destinations. Switch 633 is arranged so that the descriptor going to the pipeline structure always has higher priority. Any time register 624 contains a composite descriptor to be sent over to the central unit pipeline structure switch 633 will be forced to transfer the contents of that register to the central unit pipeline structure. In all other situations, i.e. that is when register 624 does not contain a composite descriptor, switch 633 will be arranged to transfer the output of the result stack 625. The output switch 633 uses special circuitry that allows a single data output to be transferred to two different physical units. In the control logic area 510, the VMSM unit receives a 14 bit wide execution codes for every instruction. This is merely a translation of the actual instruction op code into this 14 bit field for the VMSM to process instructions. This input goes into a FIFO stack 627 of execution codes. This is a 14-bit wide, 16 deep stack that the VMSM unit uses to hold execution codes. The reason for the stack is that the pipeline can generate new instructions at a maximum rate of 1 new instruction for every cycle, but the VMSM unit typically takes longer to process these instructions. Therefore, the stack 627 allows synchronization of the operation of the VMSM with the central unit pipeline structure. The instructions are sent to the VMSM unit and the VMSM unit will process the instruction at the normal rate. As the VMSM completes the execution of the current instruction the stack will be checked. If additional instructions are to be executed, then the next execution code will be read out and transferred into register 628. Register 628 is a 14 bit register that represents the VMSM instruction register and contains the execution code of the instruction on which the VMSM unit is currently working. Coupled to register 628 is a one-of-two switch that allows the VMSM unit to begin execution immediately for the situations where the stack 627 is empty. The execution code will transfer into the stack 627 and into the register 628 simultaneously. The VMSM can begin immediate execution of instructions when available. The instruction register 628, is coupled to data switch 629 and this data selector is used to gate information for various control store addresses. The output of switch 629 goes into a register and this register is an 8 bit wide register that serves as the control store address register. The VMSM control unit is essentially a control store driven processor. Register 629 contains the control store address. This 8 bit address register then addresses the control store 630, a 256 deep, 76 bit wide unit. The control store bits are used for the control logic to control the switches, the arithmetic logic unit and the combinatorial logic in the input buffer, the desciptor fetch unit and the reconfiguraiton unit. Those control signals come from the control store 630. In addition, the control store 630 contains a 9 bit field that specifies information about the next state to which the control store address register should go. Eight bits of this field are used for the next actual address. Another bit determines whether the address is to be used. Switch 629 consits of three entries, one of those entries gates the execution code in the instruction register contained in 628, another one of those switch positions uses the 8 bit next state address from control store 630 and a third position is used to increment the current control store address. The control store switches and registers 631 are exactly the same as above and contain the 3 switch positions that select the starting execution code to the instruction for the beginning execution code and the next state information from the control store 632. The addressing is similar and a 9-bit field that contains the next state information is present in the form of an 8-bit field that describes the next state in terms of the address of the control store and a one-bit field to validate the next state. The output of control store 632 controls the output buffer unit 515 and the descriptor master copy unit 514 and also controls the interface that goes from the VMSM unit to the central unit pipeline structure. Control store 632 also has 256 locations and is 32 bits wide. This information is used to control the output buffer unit 515 and descriptor master copy unit 514 of the VMSM unit. The control store addressing will next be described in more detail. The 14 bit execution code that enters the VMSM unit and is loaded into the VMSM instruction register 628 can be subdivided into 3 other fields. The upper 6 bits indicates to the VMSM what operation is to be performed. The remaining bits are divided into two 4-bit fields that reference descriptors that are being used. The 6 bits are transferred through switch 629 as the VMSM begins instruction execution. Switch 629 has one position dedicated to the initial control store access of every instruction and the control store address in that situation is equal to the 6-bit execution code value with two 0s buffered on the end so that 6 bits plus the two 0s provides the starting 8 bit address. The 8 bit address is used to index into the control store for the first time for that given instruction. Once the first location is accessed for the given instruction, then two possibilities are present for the next address. The counter can be incremented, in which case the control store will be sequenced, or the next state field, which is a 9 bit field, can specify the address to which a transfer is desired. This mechanism allows the VMSM to transfer, provide some sequencing ability and to address the control store to reference various instruction states as these instructions are processed. Switch 631 operates in the exact same fashion. When the VMSM is idle (i.e., waiting for instructions to process), the control stores are being accessed in location 255. That is, registers 629 and 631 contain a 255 value and that accesses the last location in both control stores. This location is a NO OP location. As an instruction enters the VMSM unit and execution is begun, the six-bit execution code plus the two 0s are used to change the address from location 255 to the starting address of that instruction. Then a sequence through the control store is performed either by incrementing the register 629 and register 631 values or using the next state information contained in the control stores to change the address. When the VMSM has completed the instruction, the last valid state entry for that instruction will contain a transfer to location 255. As this last state location is accessed, a transfer to location 255 is performed and the VMSM is again idle at that point. Thus, the VMSM unit is a control store driven unit and the control signals from control store 630 are used to conrol the input buffer 511, the descriptor fetch unit 512 and the descriptor reconfiguration unit 513, while the control signals from control store 632 and used to control the descriptor master copy 514 and the output buffer 515.

The operation of the VMSM unit will be illustrated by execution of the virtual decor load pointer instruction. The load pointer instruction is a basic instruction, in that in the virtual decor, the operand is a pointer that references a segment descriptor that is simply loaded into a descriptor register. The instruction execution in the VMSM unit begins with the central unit pipeline to sending the VMSM unit a 14 bit execution code that tells the VMSM unit to load a pointer register. This 14 bit execution code comes into the VMSM unit during the third cycle of the central pipeline and is loaded into the VMSM instruction register 628 at the end of that cycle. The central unit pipeline is simultaneously accessing a one word operand for this instruction. In the fourth cycle of the central pipeline, the VMSM execution register 628 is used to generate the starting address for the control store, and this is gated through switch 629. The 6-bit execution code indicates the performance of a load pointer type of instruction. Two 0s are added on the end of the code and the code is loaded into the register 629 at the end of the fifth cycle of the central pipeline. Simultaneously, the operand that has been fetched by the central unit pipeline for the VMSM unit arrives from the distributor and is loaded into the data stack 610. The VMSM is going to remove the SEGID field from the operand and load the SEGID into register 611. At the end of the fifth cycle, register 629 holds the control store address, the starting location in the control store for this load pointer instruction, the data stack 610 has the operand used by this instruction stored therein and the register 611 has the virtual decor segment identity field, a 12 bit field, stored therein. In the next cycle, the operand is read from the stack 610, gated through the alignment switch 614 and loaded into the 617 register. Also in this cycle cycle, the SEGID field, stored in the register 611, along with the constant stored in the register 613, are applied to the combinatorial logic unit 616 and a SEGID decode is done. This decode is used to determine if the SEGID field is referencing a descriptor that must be fetched from memory or a descriptor already available in the VMSM unit. Assuming that the SEGID field represents a descriptor that must be fetched by the VMSM unit, as determined by the combinatorial logic 616, switch 615 is taking the SEGID field contained in register 611 and formatting the field into an instruction. During this cycle, the instruction is formed and is sent over to the central unit pipeline. The format of this instruction (c.f. FIG. 3) uses a special OP Code that informs the pipeline to fetch a descriptor for the VMSM unit. The output of the switch 615 is the the Y field for this instruction. This OP code for this special instruction is generated by the 616 logic and contains bits (18.35) of the instruction. The VMSM unit generates a 36 bit instruction and transfers it to the central unit pipeline structure. This instruction contains an address and an OP Code which requests the central unit pipeline to fetch a descriptor using this address and to send that two-word descriptor to the VMSM unit. The instruction goes into the central unit pipeline, the pipeline performs the operation with the result that, after the descriptor is fetched from memory, the descriptor will be sent on the two word wide interface from the distributor into the VMSM data stack 610. While the pipeline is performing the fetch on behalf of the VMSM unit, the VMSM unit is waiting for this descriptor. When the descriptor arrives, in the fifth cycle of the central pipeline, the descriptor is loaded into data stack 610. The next cycle, the descriptor is extracted from data stack 610, transferred through switch 614, (for this type of simple descriptor load, there is no data realignment performed by this switch), into the descriptor reconfiguration unit 513 in the register 618. The switch associated with this register will be set to select the descriptor from the data stack 610. In the next cycle, the descriptor which is currently residing in register 618 will be gated through switch 620 to form the composite descriptor. The arithmetic logic unit 621 will perform whatever manipulation that is required. In a simple load pointer type instruction, the arithmetic logic unit will pass the contents of switch 620 therethrough. The composite descriptor is loaded into register 624, which then contains the composite descriptor which for the virtual decor descriptor is similar. In the next cycle, the composite descriptor in register 624, is gated through switch 633 and the composite descriptor is transferred to the central unit pipeline structure. Simultaneously the composite descriptor 624 is loaded into the descriptor master copy stack 626 at the location that identifies the pointer register being loaded. As an example, if pointer register 7 is being loaded, the contents of 624 are loaded into the location reserved for pointer register 7 in the master copy stack 626. The descriptor in register 624 is loaded into result stack 625. (This type of process, where the composite descriptor is involved in three simultaneous operations is unique to the virtual decor. For the other decors, the Multics decor and the basic decor, a composite descriptor is generated and sent to the central unit pipeline structure through switch 633. On another cycle, the decor-dependent format is generated and is stored in the master copy registers 626 and the result stacks 625. Returning to the virtual decor example, while these operations are being performed in the output buffer unit 515 and the descriptor master copy 514, the descriptor reconfiguration unit 513 is processing the SEGID field, which is the second result the VMSM unit generates on a load descriptor operation. The first result is the descriptor itself, and the second result is the SEGID. In this situation, the SEGID data would be contained in register 617 and it will then be gated through the switch 619, through the arithmetic logic unit 621, and loaded into register 624. In the next cycle, the SEGID is contained in register 624 and will be loaded into the result stack 625 so that the collector can update its copy of the SEGID. Concerning the control logic 510 mentioned earlier, the first location of the control store is accessed while a determination is made whether the VMSM unit needed a descriptor from the central unit pipeline structure or if the descriptor was available. While the pipeline was fetching the descriptor, the control logic was waiting for that descriptor to be sent to the VMSM unit. Once that descriptor arrives in the data stack 610, then the control logic continues and begins accessing new control store locations. When load pointer instruction is complete, the control stores will branch back to the 255 state (the NO OP state) and will loop at that 255 address until the next instruction arrives.

Figure 7A:
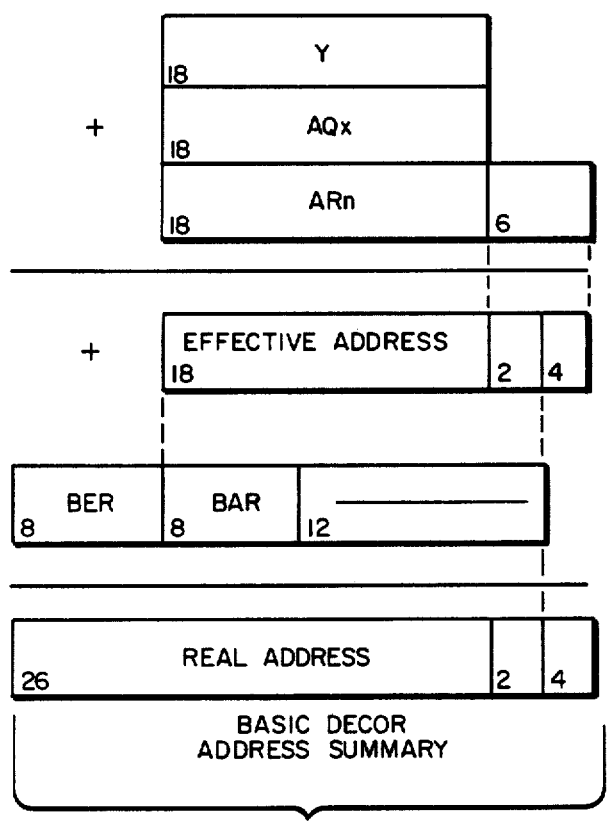
FIG. 7A is a symbolic diagram of the addressing mechanism in the basic decor.
Figure 7B:
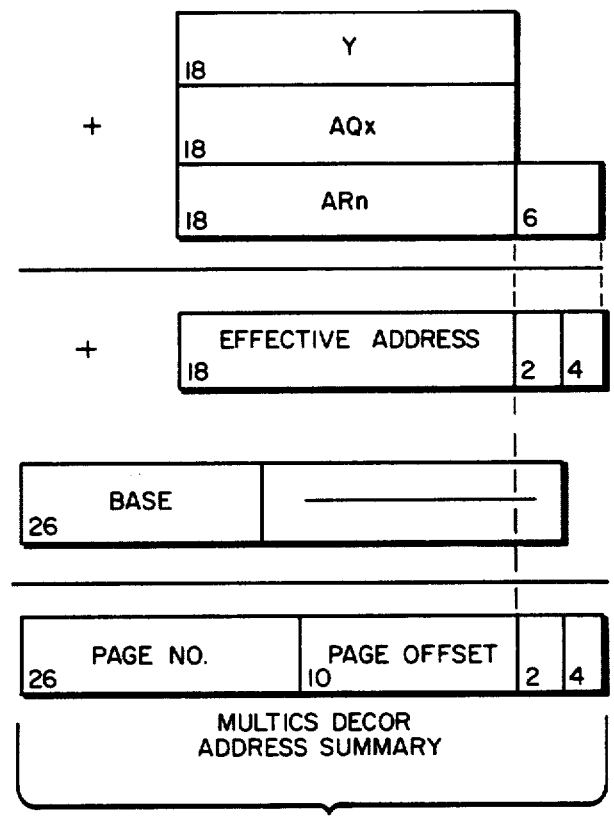
FIG. 7B is a symbolic diagram of the addressing mechanism of the multics decor.
Figure 7C:
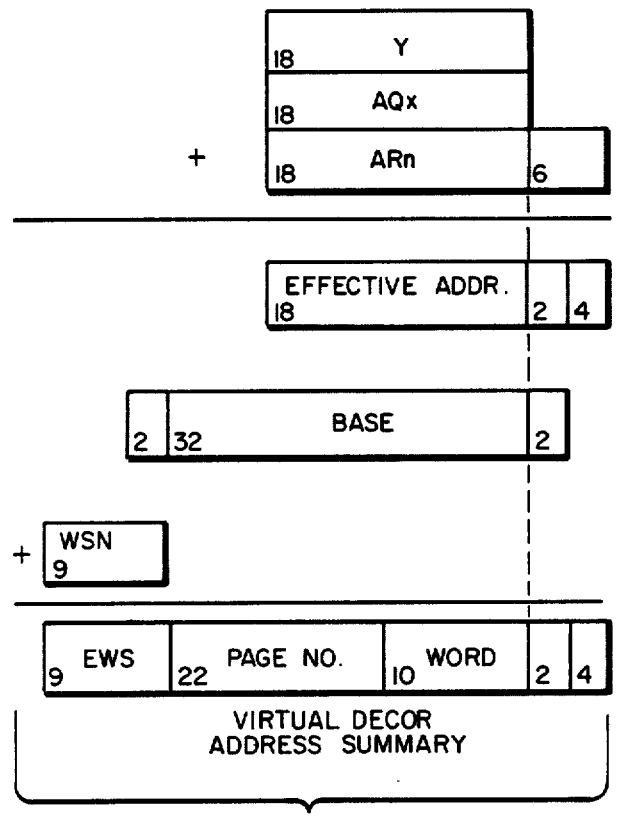
FIG. 7C is a symbolic diagram of the addressing mechaniam of the virtual decor.
Figure 7D:
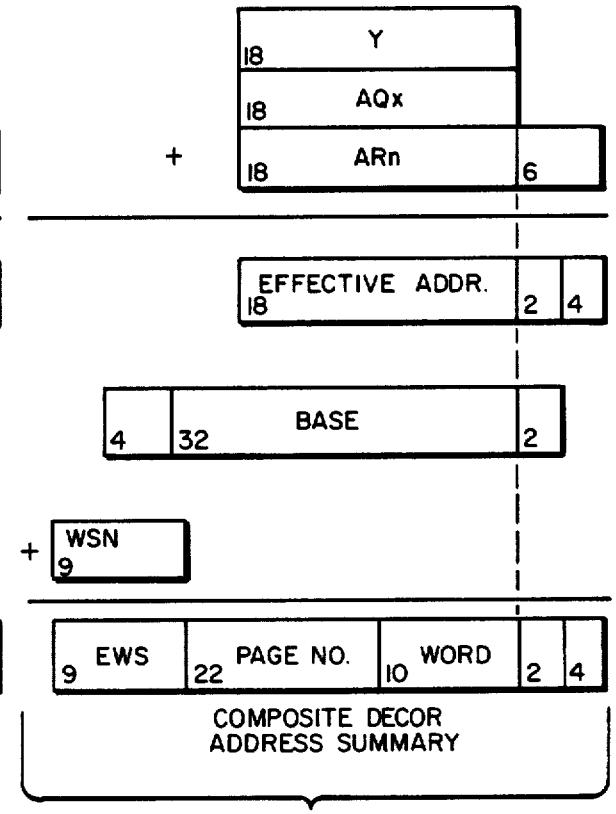
FIG. 7D is a symbolic diagram of the addressing mechanism of the composite decor.

Referring next to FIGS. 7A, 7B, 7C and 7D, a comparison of the address formation of the basic decor, Multics decor, virtual decor and the composite decor is shown. In each decor, the initial address function to obtain an intermediate address referred to as the effective address, includes the combination of the Y field from the instruction word, the AQX register determined by the tag field of the instruction word and the ARn register determined, in the preferred embodiment, by the three most significant bits of the Y field of the instruction word. The next step is to provide an intermediate address, referred to as the virtual address. Referring to FIG. 7A, the virtual address in the basic decor is formed by combining the effective address with a BAR field (obtained from the descriptor base field and the BER field (obtained from the extension field of the descriptor) (c.f. FIG. 4A). Referring to FIG. 7B, the Multics decor virtual address is formed by combining the effective address with a base field from the Multics descriptor base field (c.f. FIG. 4C). The virtual address includes a page number and a page offset. Referring to FIG. 7C the virtual address is formed in the virtual decor by combining base field (from the descriptor base field) and the working space number with the effective address. The virtual address includes an effective working space (EWS) field, a page number field and a word field. In FIG. 7D, the virtual address for the composite decor address formation is obtained by combining the effective address with the base field (obtained from the descriptor base field) and a working space number. The virtual address of the composite decor includes an effective working space field (EWS), a page number field and a word number field. In the preferred embodiment, but not illustrated, the virtual address of the Multics, virtual and composite decors are all paged to obtain a real address. For the basic decor, the virtual address is the same as the real address. In addition, in the preferred embodiment the page operation is performed on the real address to obtain the physical address, i.e., the address in the physical storage address space of the memory.

Referring next to FIG. 8, a schematic diagram of the components for virtual address formation is shown. Instruction register 818 contains the Y address field. The highest order three bits of the Y address field are used to address a sixteen level descriptor stack 802 previously loaded with composite descriptors loaded from the VMSM and an eight level ARn stack 803. Bit 29 of the instruction word conrols gate 801 to determine if the two stacks are actually addressed. Similarly bits 30-35 of the instruction word, referred to as the tag field control the accessing of the AQX 810 stack. The OP CODE contained in the field of bits 18-27 determine how the various fields will be combined to form the address. This figure illustrates the position of the descriptor stack for which the VMSM unit contains the descriptor master copy stack 626.

Each time that a descriptor is extracted from the main memory unit 3 and transferred to the central processing unit 1, the descriptor is reformatted by the VMSM unit into a composite descriptor format. In this manner, the data needed for address formation can be identified when it is needed. For example, the base address in the composite format is always in the same location. Therefore apparatus is not needed for each addressing scheme, but composite addressing mechanism, encompassing all descriptor formats is possible. Similarly other control attributes normally found in the descriptors, such as flags can find a standard position in the composition descriptor, allowing a composite apparatus, as distinguished from a decor-dependent apparatus to be used.

The above description is included to illustrate the operation of the preferred embodiment and is not meant to limit the scope of the invention. The scope of the invention is to be limited only by the following claims. From the foregoing discussion, many variations would be apparent to one skilled in the art that would yet be encompassed by the spirit and scope of the invention.

What is claimed is:

1. Apparatus for forming composite descriptors in a data processing system operating under the control of a plurality of different operating systems, said system including means for preparing addresses of data stored in a random access memory of the system, said address preparation means using base and bound data, which base and bound data are found in O.S. descriptors of each of the operating systems, the format of the O.S. descriptor of each of the operating system differing from one another; said composite descriptor including all the data of an O.S. descriptor needed by the means for preparing addresses, said composite descriptors having a single format; said apparatus comprising:

input buffer means for temporarily storing each O.S. descriptor applied to the apparatus by the system;

control unit means for receiving instructions from said system and for producing control signals responsive to each instruction received; and reconfiguration means in response to receiving an O.S. descriptor from the buffer means and control signals from the control unit, for producing a composite descriptor; and means for transmitting the composite descriptor produced by the reconfiguration means to the means for preparing addresses.

2. The apparatus of claim 1 which further includes descriptor master copy unit means for storing copies of O.S. descriptors from which a composite descriptor has been produced.

3. In a data processing system having a virtual memory a security management execution unit (VMSM), and a control unit pipeline structure (CUPS) which includes address preparation means for preparing physical addresses of operands and instructions in a random access memory of the system, said system operating under the control of a plurality of operating systems with each operating system having O.S. descriptors which O.S. descriptors include base and bound data used by the address preparation means to prepare a physical address, the O.S. descriptors for each operating system having different formats; the method of producing a composite descriptor containing the base and bounds data of an O.S. descriptor, said composite descriptor having a single format which differs from the format of each operating system descriptor comprising the steps of:

1. applying an O.S. descriptor and an execution code to the VMSM;
2. determining from the execution code the type of O.S. descriptor applied in step 1;
3. decoding the execution code to produce control signals for controlling logic elements of the VMSM to produce a composite descriptor using data from the O.S. descriptor applied in step 1; and
4. applying the composite descriptor to the CUPS which uses data from the composite descriptor in preparing physical addresses of operands and instructions.

4. The method of claim 3 which includes the additional steps of:

5. applying the composite descriptor produced in step 3 of claim 3 to the logic elements of the VMSM;
6. controlling the logic elements of the VMSM to regenerate the O.S. descriptor as applied in step 1; and
7. storing the regenerated O.S. descriptor in a master copy unit of the VMSM.

5. The method of claim 4 including the additional steps of:

8. retrieving a regenerated O.S. descriptor stored in the master copy unit in response to an instruction applied to the VMSM when the address preparation means of the CUPS needs the data of said requested O.S. descriptor to produce a physical address; and
9. repeating steps 2, 3, 4, 5, 6 and 7 of claims 3 and 4.

6. In a data processing system having address preparation means for producing a physical address in a random access memory of the system using data from operating system descriptors for a plurality of operating systems, the formats of the data of the operating systems descriptors not being the same;

apparatus for producing a compatible descriptor which includes data from the operating system descriptors which data is required by the address preparation means to produce a physical address comprising:

circuit means for receiving an operating system descriptor;

control means for receiving an instruction and for producing control signals; and reformatting means responsive to control signals produced by the control means for producing a composite descriptor using data from the operating system descriptor received by the means for receiving an O.S. descriptor; and means for transmitting the composite descriptor to the address preparation means.

7. In a data processing system as defined in claim 6 which further includes:

means for applying a composite descriptor produced by the reformatting means to the reformatting means, which reformatting means responsive to control signals produced by the control means reproduces the operating system descriptor; and means for storing the reproduced operating system descriptor.

8. In a data processing system as defined in claim 7 which further includes:

means responsive to control signals produced by the control means for retrieving an operating system descriptor from the means for storing reproduced operating system descriptors and for applying the retrieved operating system descriptor to the reformatting means for producing a composite descriptor, said means for transmitting the composite descriptor to the address preparation means.

9. In a data processing system as defined in claim 8 which further includes means for obtaining from system memory an operating system descriptor if the operating system descriptor is required to produce a physical address and the operating system descriptor is not stored in the means for storing reproduced operating system descriptors.

10. In a data processing system as defined in claim 9 in which the reformatting means includes an arithmetic logic unit.

11. In a data processing system as defined in claim 10 in which the number of operating systems is three.

* * * * *